June 11, 1963 A. K. EDGERTON 3,093,785

PHOTOELECTRIC SIGNAL GENERATOR

Filed Aug. 31, 1959

INVENTOR.
ALBERT K. EDGERTON
BY Lilly & Nyhagen
Attorneys

United States Patent Office 3,093,785

Patented June 11, 1963

3,093,785
PHOTOELECTRIC SIGNAL GENERATOR

Albert K. Edgerton, 9763 Johanna Place, Sunland, Calif.

Filed Aug. 31, 1959, Ser. No. 837,248
10 Claims. (Cl. 321—34)

This invention relates to electrical signal generators and has as its general object to provide a unique photoelectric signal generator.

A more specific object of the invention is to provide a photoelectric signal generator in which the output amplitude is a function of the relative positions of an energy radiator and an energy sensitive receiver and in which these relative positions are changed in accordance with a predetermined function to produce a desired output wave form.

A further object of the invention is to provide a photoelectric signal generator of the character described in which the output amplitude is independent of the rate of change in the relative positions of the radiator and receiver.

A further object of the invention is to provide a photoelectric sine wave generator wherein the output amplitude is a continuous function of the sine of the angle of rotation of a rotary input shaft and is independent of the angular velocity of the shaft.

A further object of the invention is to provide a photoelectric signal generator of the character described which can be arranged to generate either several electrical output signals having the same or different wave forms and predetermined phase angles or a single electrical output signal having a given wave form.

A further object of the invention is to provide a photoelectric signal generator of the character described which is capable of producing either a D.C. output signal or an A.C. signal of a fixed or variable frequency ranging from zero frequency or very low frequency to mid audio frequencies.

A further object of the invention is to provide a photoelectric signal generator of the character described in which the amplitude of the output signal is, at all times, a function of the amount of radiant energy incident on an entire photosensitive surface area so that the extremely linear emissive characteristics of such a surface as a whole are taken advantage of and distortion resulting from the inherent point-to-point variation in the emissive characteristics of a photosensitive surface is avoided.

A further object of the invention is to provide a photoelectric signal generator of the character described which has infinite resolution so that the output signal is a continuous rather than a step function.

A further object of the invention is to provide a photoelectric signal generator which produces an output signal with low harmonic distortion.

A further object of the invention is to provide a photoelectric signal generator of the character described which is ideally suited to either optical or electrical modulation of its output signal.

Other objects of the invention are to provide a photoelectric signal generator characterized by its extreme simplicity, economy of manufacture, compact size and other unique features of construction which render the generator ideally suited to its intended purposes.

Briefly, the objects of the invention are attained by effecting relative movement of an energy radiating surface and an energy sensitive receiving surface in such a way that the amount of radiant energy incident on the receiving surface, and, therefore, its output voltage, varies according to a predetermined function. This is accomplished in the illustrative embodiment of the invention, comprising a sine wave generator, by rotating a flat light radiating surface between two photocells on an axis in the plane of and bisecting the radiating surface. The arrangement is such that the photocells receive light during alternate half revolutions of the surface, the intensity of which at each photocell varies in accordance with a sine function of the angle of rotation of the radiating surface.

The output of each photocell is, therefore, one-half of a sine wave. The output from one cell is inverted and electrically added to the output of the other photocell to produce a complete sine wave.

A better understanding of the invention may be had from the following detailed description thereof taken in connection with the attached drawings, in which.

Figures 1, 2, 3, 4:
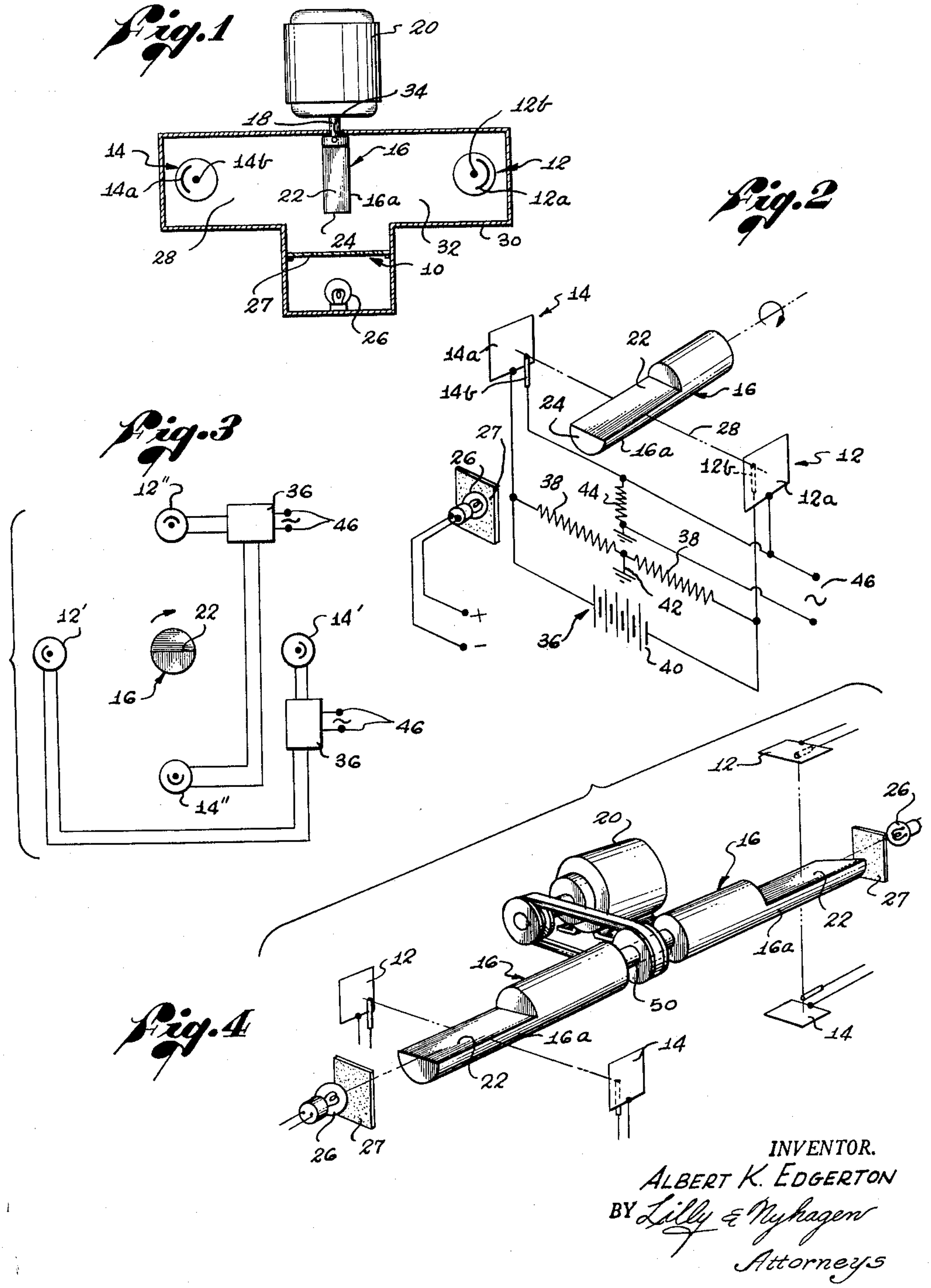
FIG. 1 is a plan view in section of one illustrative embodiment of the invention.
FIG. 2 is a schematic circuit diagram of the generator of FIG. 1.

FIG. 3 diagrammatically illustrates a multiphase photoelectric generator according to the invention; and FIG. 4 diagrammatically illustrates a modified multiphase generator.

In FIGS. 1 and 2, the numeral 10 denotes the energy radiating means of the illustrated generator. The numerals 12 and 14 denote the radiant energy receivers of the generator which are sensitive to the radiant energy emanating from the radiator.

Radiator 10 illustratively comprises a light transmitting cylinder or "optical commutator" 16, composed preferably of a plastic substance such as methyl methacrylate, marketed as Lucite. This cylinder is mounted on the shaft 18 of a motor 20 for rotation of the cylinder on its central axis by the motor.

A portion of the cylinder is cut away to provide the latter with a semicylindrical end 16a having a face 22. This face is ground flat and is located in the plane of the axis of rotation of the cylinder. The axis, of course, bisects the face. The semicircular end face 24 of the semicylinder 16a is polished clear to pass light to the interior of the semicylinder in the direction of its axis of rotation.

Located opposite this polished end face of the semicylinder is a flat field light source consisting of a lamp 26 and a light diffusion plate 27. Uniformly diffused light from this source is incident on the end face 24 of the semicylinder and illuminates its ground face 22. This illuminated ground face forms the light radiating surface of the generator. All of the remaining surfaces of the cylinder 16, except the end face 24, are rendered opaque in any suitable way, as, for example, by coating them with an opaque paint.

The radiant energy receivers 12 and 14 illustratively comprise photocells having photosensitive cathode surfaces 12a and 14a and anodes 12b and 14b. These photocells are arranged at diametrically opposite sides of the semicylinder 16a and have their photosensitive surfaces 12a and 14a facing the semicylinder. The centers of these photosensitive surfaces are located approximately on an axis 28 perpendicular to and intersecting the axis of rotation of semi-cylinder 16a at a point midway between the end edges of its radiating face 22.

The photocells are suitably shielded against all light except that emanating from the radiating surface 22. This may be accomplished by enclosing the parts in a light-proof housing 30 having a long rectangular chamber 32. The photocells are located at the ends of this chamber while the cylinder extends across the center of the chamber. The motor shaft extends through a circular opening 34 in the side wall of the housing. The lamp 26 is enclosed, as shown, but exposed to the end face 24 of the semicylinder. The interior walls of the housing are preferably painted black.

During clockwise rotation of the semicylinder 16a through 180 degrees from its position of FIG. 2, only photocell 12 receives light from the light radiating surface 22. During the next 180 degree rotation of the semicylinder, only photocell 14 receives light from the surface. Photocell 12 is then again illuminated from the surface during the following 180 degree rotation of the semicylinder, and so on. Thus, the photocells are illuminated alternately by the radiating surface as the semicylinder turns.

In any angular position of the semicylinder, the amount of light incident on the photocell then receiving light is a sine function of the angle of rotation of the radiating surface 22 from its initial or zero degree position of FIG. 1. Also, when the semicylinder is rotating, the amount of light striking each photocell varies in accordance with a function of the sine of the angle of rotation of the radiating surface. The reason for this is obvious. Thus, when a flat surface is rotated on an axis in its plane and viewed in a direction normal to the axis, the projection of the surface area at the viewing position, or, in other words, the apparent area or size of the surface at the viewing position, varies in accordance with the sine of the angle of rotation of the surface. It follows that if the surface is uniformly illuminated, the amount of light received at the viewing position also varies sinusoidally.

We have, therefore, two photocells illuminated by the rotating, sinusoidally changing light radiator 22 during alternate half cycles or revolutions of the radiator. The output voltages generated by the photocells are, accordingly, half sine waves which are 180 degrees out of phase. One of these voltages is inverted and combined electrically to provide a complete electrical sine wave. This may be accomplished with various external mixer circuits, one of which is illustrated at 36 and will now be described.

Circuit 36 comprises a voltage divider 38 connected across a battery 40 and having a grounded center tap 42. The plate of photocell 12 is connected to one end of this voltage divider and the cathode of photocell 14 is connected to the other end of the voltage divider. The cathode of photocell 12 and the plate of photocell 14 are tied to one end of a common load resistor 44, the other end of which is grounded. The output of the circuit is developed between a pair of output terminals 46 connected across the load resistor.

Each photocell thus receives one-half of the battery voltage. When either photocell is illuminated from the radiating surface, of course, it conducts while the other photocell, which is then dark, presents, essentially, an open circuit. The current passed by each illuminated photocell, and, therefore, the output voltage developed across the load resistor 44, are obviously proportional to the amount of light incident on its plate, or photosensitive surface.

From what has just been said and from the earlier discussion of the sine function relationship between the angular position of the radiating surface 22 and the amount of light incident on each illuminated photocell, it is clear that as the radiating surface turns, two electrical half sine waves, 180 degrees out of phase, are developed across the common load resistor 44. The circuit connections are also obviously such that one-half sine wave is inverted with respect to the other so that the output voltage developed across the output terminals 46 is a complete electrical sine wave.

It will be observed that when the radiating surface 22 is in its zero position of FIG. 2 or a position 180 degrees from the zero position, approximately one-half of each photosensitive surface is illuminated by a small amount of light received from the radiating surface. Since the outputs of the photocells are combined in 180 degrees inverse phase relation, the voltages generated as a result of this illumination of one-half of each photocell surface cancel. The generator output is, therefore, zero as it should be in these two positions of the radiating surface.

The present method of generating an electrical sine wave has several highly important and advantageous features. The entire surface area of each photocell is used at all times. As a consequence, output signal distortion due to the inherent point-to-point nonlinear emissive characteristics of a photosensitive surface is avoided and, quite to the contrary, advantage is taken of the extremely linear emissive characteristics of the photosensitive surfaces as a whole.

It will be noted that the generator produces an output, which is a sine function of the angle of the radiating surface 22, whether the radiating surface is rotating or stationary. Moreover, the output amplitude is completely independent of the angular velocity of the radiator. Extremely low frequency signals, as well as D.C. signals, may thus be generated. On the other hand, since the size and mass of the moving parts of the generator, namely, "optical commutator" 16, are small, the latter may be driven at extremely high angular velocities to produce high frequency signals, the maximum signal frequency being limited only by the maximum angular velocity at which the optical commutator may be safely driven.

The present generator has been found to have low harmonic distortion, i.e., less than 1.5 percent. Since the method of signal generation does not involve a step function, the generator also has, in effect, infinite resolution.

It is evident that the shape of the radiating surface does not significantly affect the sine wave output of the generator so that the surface does not have to be rectangular, as shown. For minimum output signal distortion, the radiating surface should be flat. Also, the rotational axis of the radiating surface should bisect the surface. The reason for this will be obvious.

Thus, when the surface is in a plane exactly perpendicular to the axis 28 of the photocells, all points on the surface are approximately the same distance from the facing photocell. During rotation of the surface from this position, the part of the surface at one side of its rotational axis moves toward the facing photocell while the part of the surface at the other side of the axis moves away from the facing photocell. If the surface is flat and the axis bisects the surface, the increase in the amount of light incident on the photocell occasioned by movement of the one part of the surface toward the photocell will be offset by the decrease in the amount of incident light occasioned by movement of the other part of the surface away from the photocell and no distortion occurs. It is for the same reason that the axis is located in the plane of the surface since location of the axis out of the plane of the surface would result in an eccentric movement of the radiating surface as a whole with respect to the photocells. This eccentric motion would, of course, introduce distortion into the generator output.

At this point, it is thought advisable to point out that the requirements just mentioned, i.e., flatness of the radiating surface, the location of its axis of rotation in the plane of the surface, and the bisection of the surface by the axis, apply only when the output wave form is to be a sine wave. Other wave forms, however, can be generated by changing the position of the radiating surface with respect to its rotational axis, for example, or by using a radiating surface which is not flat. The output wave form can also be altered by relatively moving the radiating surface and photocells in other than pure rotational motion or by varying any other parameters which affect the output wave form. In some cases only a single photocell or other radiant energy receiver might be used.

In a similar vein, it is evident that the output voltage signal from the generator can be modulated in various ways, such as electrically by varying the intensity of the lamp. This could be accomplished by a motor driven variable resistance means in circuit with the lamp, for example. In the alternative, circuit 36 might include a circuit for modulating the output voltage directly. Modulation of the generator output can also be accomplished optically, for example, by means of a rotatably driven, variable density light filter located between the lamp 26 and cylinder 16.

Frequency modulation of the generator output can obviously be accomplished by the simple expedient of varying the speed of the generator motor.

FIGS. 3 and 4 illustrate how the invention lends itself to the generation of several phased output signals. In FIG. 3, this is accomplished by arranging several diametrically opposed pairs of photocells 12′, 14′, and 12″ and 14″ about the optical commutator 16 and combining the outputs of the pairs of photocells by means of a mixing circuit 36 connecting each pair. The outputs from the several pairs of photocells are then sine waves having phase angles determined by the angular spacing of the photocells about the optical commutator.

The multiphase generator illustrated in FIG. 4 comprises two separate generators essentially identical to the generator of FIG. 1 and having their optical commutators 16 driven from a common input shaft 50. One of these commutators is angularly displaced with respect to the other so that the outputs from the two generators are again sine waves having phase angles related to the angular displacement of their commutators.

It will be evident that while the invention has been disclosed by reference to generators which utilize visible light, radiant energy of any wave length may be used by appropriate design of the optical commutator and selection of receivers which are sensitive to the particular wave length used. Also, other types of energy radiators may be employed. For example, the radiating surface might comprise a phosphorescent surface, or a reflecting rather than a light transmitting surface, as disclosed herein, or a part of the energy or light source itself.

Clearly, therefore, an electrical signal generator has been described which is fully capable of attaining the several objects and advantages preliminarily set forth.

Numerous modifications in the design, arrangement of parts, and instrumentality of the invention are obviously possible within the spirit and scope of the following claims.

What is claimed is:

1. In an electrical sine wave generator comprising a rotary optical commutator including a semi-cylinder of light transmitting material having a flat ground face in the plane of and symmetrical about the axis of the semicylinder, means to rotate the commutator on the axis of said semicylinder, a light to illuminate said face, and a pair of photocells at diametrically opposite sides of said semicylinder to be illuminated by said surface alternately as the commutator turns.

2. The subject matter of claim 1 including a mixer circuit connected to the outputs of said photocells for combining the output from one photocell with an inverted output of the other photocell to produce an electrical sine wave.

3. An optical commutator for use in a photoelectric sine wave generator, comprising a member having a flat radiant energy diffusion surface, means for rotating said member on an axis in the plane of and bisecting said surface, and means for uniformly illuminating the surface with radiant energy.

4. In a sine wave generator, the combination of: a light radiating surface comprising a source of diffused light, means for rotating said surface about an axis symmetrically intersecting the area of said light radiating surface, and a photosensitive light receiving surface arranged to view said rotating light radiating surface and to generate an output voltage proportional to light incident thereon, the light radiated from said radiating surface and incident on said receiving surface being a function of the sine of the angle of rotation of said radiating surface.

5. The subject matter of claim 4, wherein said light radiating surface is flat.

6. The subject matter of claim 4, wherein the center of the light receiving surface is intersected once each revolution of said light radiating surface by an axis normal to said light radiating surface.

7. The subject matter of claim 4, wherein said light radiating surface is flat and said axis is in the plane thereof.

8. In a sine wave generator, the combination of: a light radiating surface comprising a source of diffused light, means for rotating said surface about an axis symmetrically intersecting the area of said light radiating surface, two photosensitive light receiving surfaces arranged to view said rotating light radiating surface alternately from diametrically opposite sides during successive half turns of the light radiating surface, and to generate output voltages proportional to light incident thereon, and means for combining said output voltages in inverted relation.

9. The subject matter of claim 8, wherein said light radiating surface is flat, and wherein the center of each light receiving surface is intersected once each revolution of said light radiating surface by an axis normal to said light radiating surface.

10. The subject matter of claim 8, wherein said light radiating surface is flat and said axis is in the plane thereof.

References Cited in the file of this patent

UNITED STATES PATENTS

| | | |
|---|---|---|
| 1,866,573 | Lux | July 12, 1932 |
| 2,096,902 | Lamb | Oct. 26, 1937 |
| 2,182,000 | Nichols | Dec. 5, 1939 |
| 2,256,595 | Metcalf | Sept. 23, 1941 |
| 2,672,603 | Cutler | Mar. 16, 1954 |
| 2,682,801 | Davidson et al. | July 6, 1954 |
| 2,790,952 | Pietenpol | Apr. 30, 1957 |
| 2,815,487 | Kaufman | Dec. 3, 1957 |
| 2,964,993 | Witt | Dec. 20, 1960 |